(12) United States Patent
Geller

(10) Patent No.: US 8,382,302 B2
(45) Date of Patent: Feb. 26, 2013

(54) PORTABLE FOLDABLE LIGHTING DESIGNER

(76) Inventor: Wolfgang Peter Geller, Garlstorf (DE)

( * ) Notice: Subject to any disclaimer, the term of this patent is extended or adjusted under 35 U.S.C. 154(b) by 564 days.

(21) Appl. No.: 12/687,573

(22) Filed: Jan. 14, 2010

(65) Prior Publication Data

US 2010/0182793 A1 Jul. 22, 2010

(30) Foreign Application Priority Data

Jan. 16, 2009 (DE) ................ 20 2009 000 682 U

(51) Int. Cl.
*G03B 15/02* (2006.01)

(52) U.S. Cl. ............... 362/18; 362/3; 362/8; 362/16; 362/352; 362/355

(58) Field of Classification Search ............ 362/3, 8, 362/16, 18, 352, 355, 357, 358
See application file for complete search history.

(56) References Cited

U.S. PATENT DOCUMENTS

| | | | |
|---|---|---|---|
| 2,953,145 A * | 9/1960 | Moss et al. ............... 135/98 |
| 4,312,371 A | 1/1982 | Koon | |
| 4,951,333 A | 8/1990 | Kaiser et al. | |
| 5,023,757 A * | 6/1991 | Shirilla ............... 362/16 |
| 5,024,262 A | 6/1991 | Huang | |
| 2001/0009513 A1 * | 7/2001 | Geller ............... 362/319 |
| 2007/0283991 A1 * | 12/2007 | Sherts ............... 135/90 |

FOREIGN PATENT DOCUMENTS

| EP | 1302121 | 4/2003 |
|---|---|---|
| GB | 1562282 | 3/1980 |

* cited by examiner

*Primary Examiner* — Meghan Dunwiddie
(74) *Attorney, Agent, or Firm* — Sand & Sebolt

(57) ABSTRACT

A portable foldable lighting designer (10) which includes a closed frame (11) made from an elastic, deformable material, where the frame is movable between a folded and an unfolded position, and a covering (12). The covering (12) is arranged in the frame and held by the latter to manipulate the light, and is kept tightened in the plane of the frame, when the lighting designer is completely unfolded by the material tension of the material of the frame. The covering is dimensioned smaller in a direction (B) than the width (D) of the uncovered frame in the completely unfolded position.

21 Claims, 2 Drawing Sheets

PORTABLE FOLDABLE LIGHTING DESIGNER

CROSS REFERENCE TO RELATED APPLICATIONS

This application claims priority from German Utility Model No. DE 20 2009 000 682.4 filed Jan. 16, 2009; the disclosure of which is incorporated herein by reference.

BACKGROUND OF THE INVENTION

1. Technical Field

The invention relates to a portable foldable lighting designer having a covering engaged in a foldable frame, where the covering is dimensioned smaller in a direction (B) than the width (D) of the uncovered frame in the completely unfolded position.

2. Background Information

It is known to manipulate the lighting conditions when taking photographs or shooting film for the purpose of achieving an optimal exposure result. This applies not only in the studio, but also to taking photographs and filming outdoors. Besides lighting the photography/film set with artificial light (lamps/flash), one can also use reflectors that reflect artificial light or natural sunlight for that purpose, to direct it in a controlled manner on the areas of the photography/film subject to be illuminated. Similarly, it is also known to influence the lighting conditions on the photography/film set with diffusers or reducers, which can be inserted in a controlled way in the light path of natural or artificial light.

Thus, a "lighting designer" in the sense of this invention is a device which is used for the controlled modification of the light path to influence the lighting of a photography/film set, as reflector or as diffuser, or for the controlled reduction of the light, or even to achieve combinations of these effects.

A very simply constructed, but nevertheless effective portable foldable lighting designer was developed more than 30 years ago, as described in GB 1562282, particularly for mobile use in outdoor photography/filming, but also for other application types. This element is a circular closed hoop, which can also be referred to as a frame, and which is made of a flexible material, particularly spring steel, with a fabric-like covering that is adapted to the dimensions of the hoop, and presents a kind of tunnel at its outer margin, through which the hoop is guided. The hoop made of the spring elastic material is deformable to the extent that the lighting designer can be reduced in size by twisting the hoop and folding it on top of itself, making it possible, for example, to hold it in a transport pouch.

Such lighting designers are still used frequently today; they form a simple and cost effective alternative for lighting designers that are more stable, but also more expensive, and based on frames that are made with solid rods and covered with stretched fabric.

However, the known lighting designers of the above described type frequently present the problem that the covering is not sufficiently tight, even in the unfolded state, frequently even forming folds which, for example in the application as a reflector, makes it difficult to manipulate the light in a defined way, and thus light the photography/film set. This deficiency is the result of the traction exerted by the spring steel hoop on the covering being insufficient to tighten the covering sufficiently. This problem becomes particularly pronounced with increasing age of the lighting designer, because, on the one hand, the tension force of the spring steel decreases, and, on the other hand, the textile covering is distended, and thus loses its tautness.

On this background, the problem of the invention is to improve a portable, foldable lighting designer of the type mentioned in the introduction in such a way that it keeps the covering more reliably taut in the unfolded state.

SUMMARY OF THE INVENTION

The problem is solved by a portable foldable lighting designer having the characteristics of Claim 1, where the characteristics indicated in the characterizing portion contribute particularly to solving the problem. Advantageous variants and embodiments of a lighting designer according to the invention are indicated in the dependent secondary Claims 2-10.

The insight that is essential for the invention is based on the fact that, due to an even adaptation of the dimensioning of the hoop or frame, and of the covering held by it, deficits with regard to reliable tautness of a covering material can occur more easily. If the spring force of the hoop or frame decreases here, or if the material of the covering slackens and becomes distended, then the frame can no longer stretch the covering sufficiently during the folding of the lighting designer, resulting in the formation of folds.

The invention is based here on a very effective means where the covering is formed in each case in a controlled way so it is undersize in one direction compared to the uncovered, completely unfolded frame. This undersize is in any case greater than a possible undersize in a second direction, so that the result is an asymmetric distribution of the tension forces during the unfolding of the lighting designer. Due to this undersize, a clear tension force is exerted in each case by the frame on the covering, where the frame at this place continues to push outward in its unfolded position, and the traction in the end leads to a tightening of the covering. Even if the tension force of the frame decreases, or in the case of a change of the size of the covering due to age-caused distension, this undersize offers additional reserves that are sufficient to guarantee a reliable and smooth tightening of the covering in the unfolded state of the lighting designer.

The invention thus purposefully goes against the preexisting state of the art according to GB 1562282, on the basis of which such lighting designers have been constructed to date, and where the shape of the covering matches exactly the shape of the hoop; in the example of GB 1562282, a circular covering is used accordingly with a circular reception of a hoop that is also circular.

In a simple embodiment variant, as claimed in Claim 2, the frame (which can also be referred to as the hoop), can be, for example, circular, while the covering presents a shape that differs from the circular shape, with a width that is less than the diameter of the uncovered frame, in a shorter extension direction. This can occur particularly advantageously by using an oval design or an ellipsoid design of the covering, where the width or the diameter of the oval or of the ellipse along the small side is chosen to be smaller with clear undersize with respect to the diameter of the circle of the unfolded, uncovered frame.

To prevent the lighting designer from becoming deformed in the completely unfolded state so it is no longer in the desired planes, and, for example, buckles forming a saddle surface, it is advantageous for the covering to be designed as indicated in Claim 3. Thus, the frame can compensate for a deformation that is imposed by the undersize in the first direction, by extending into the direction of the oversize of the covering, thus filling the latter with tightening.

In principle, the frame can be made of any material with sufficient elasticity and deformability, such as, for example, a suitable plastic. However, it is preferred to use spring steel as material, because of the durability and the good maintenance of the spring force. The material can present a circular diameter, or it can be designed in the form of a steel band.

The covering can also be connected in a lighting designer according to the invention in the basically usual way to the frame, for example, by means of loops or tunnels formed along the periphery of the covering, through which the frame is led.

Although an embodiment of the lighting designer according to the invention that does not have such elements is possible, and falls within the scope of the invention, it is preferred to arrange at least one handle, and preferably two handles, on the frame. With such handles, the unfolded lighting designer can be held and positioned. Moreover, the handles, particularly if they are positioned as indicated in Claim 6, can have an additional stabilizing effect. Indeed, if they are arranged beyond the direction along which the covering is undersize with respect to the width of the uncovered, completely unfolded frame in this position, (for example, at mutually facing ends of the longer axis of the oval of an oval covering), then such handles can additionally assist the traction effect and the tightening due to the differences in the dimensioning between the frame and the covering, by applying an additional moment of force to the frame, which is stiffened at these places by the handles.

The covering of the lighting designer can be produced in the usual way from a textile, particularly a woven or knitted textile. However, it can also consist of a film or similar material. Furthermore, the covering can consist advantageously of an elastic material, so that, due to its intrinsic material, the tightening of the covering is assisted when the lighting designer is unfolded.

If the lighting designer is to be used as a reflector, then it is advantageous to prepare the covering so it reflects light. This can be achieved, for example, by the material of the covering itself, or by means of a coating or printing, for example, vapor deposition of a metal or a similar method.

In a similar way, if the lighting designer is to be used as a diffuser or for light reduction, the covering should be arranged so it reduces and/or diffuses light.

BRIEF DESCRIPTION OF THE DRAWINGS

Additional advantages and characteristics of the invention result from the following description of an embodiment example in reference to the figures in the appended figures. The figures show.

DETAILED DESCRIPTION OF THE INVENTION

Figure 1:
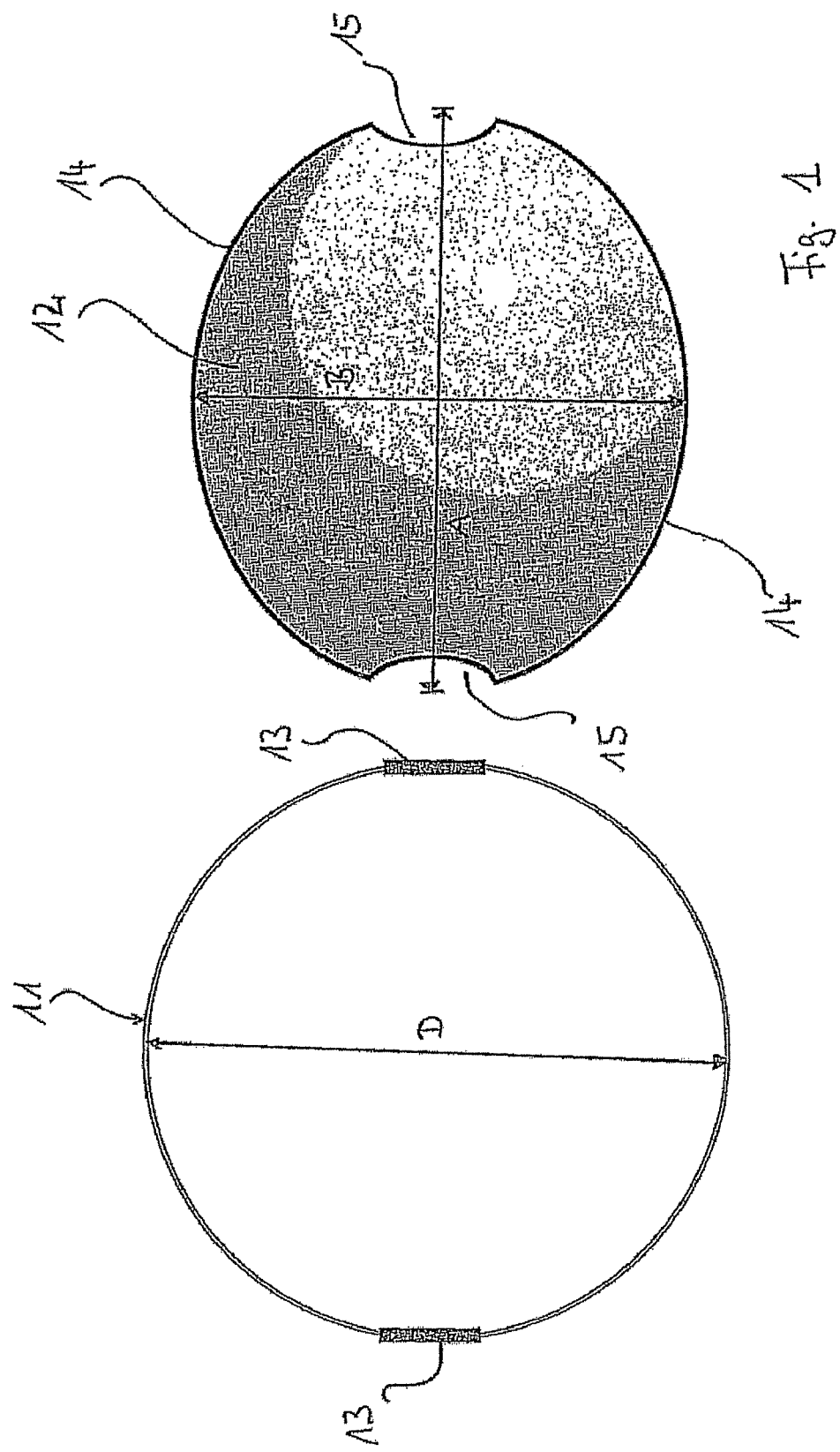
FIG. 1 separate, adjacently arranged, representations of the two elements, the frame and the covering, of a lighting designer according to the invention.

In FIG. 1, the essential components of a lighting designer 10 according to the invention (see FIG. 2) are shown, namely a frame 11 as well as a covering 12.

The frame 11 presents a closed design, and it consists of a spring elastic material, here spring steel. It is represented in FIG. 1 in a slackened and maximally unfolded position, in which it assumes essentially a circular shape with the diameter D. At two diametrically opposite positions on the frame 11, the handles 13 are arranged, which are here in the shape of a straight section that encloses the material of the frame. These handles 13 can be made, for example, of plastic, wood, metal or another suitable material. They enclose the frame 11 in such a way that they stiffen the covering in this area.

The covering 12, which consists preferably of a woven or knitted textile that presents elasticity, for example as a result of the selection of the yarn, or of an elastic film, has an oval design, in contrast to the circular shape of the frame in the fully unfolded state. Here the width A of the covering 12 in the broader extension direction corresponds substantially to the diameter D of the frame 11, although it exceeds the latter by a certain measure. The width B in the shorter extension direction of the covering 12 is formed with clear undersize compared to the diameter D. At its margin 14, in the covering 12 (not shown in greater detail here), a tunnel is formed, for example by folding or sewing, through which the frame 11 is led, and by means of which the frame 11 can be connected to the covering 12. The tunnel is interrupted only on two mutually facing sides along the width A, where pocket-like recesses 15 are introduced in the material of the covering 12, to receive the handles, as explained below in reference to FIG. 2.

Figure 2:
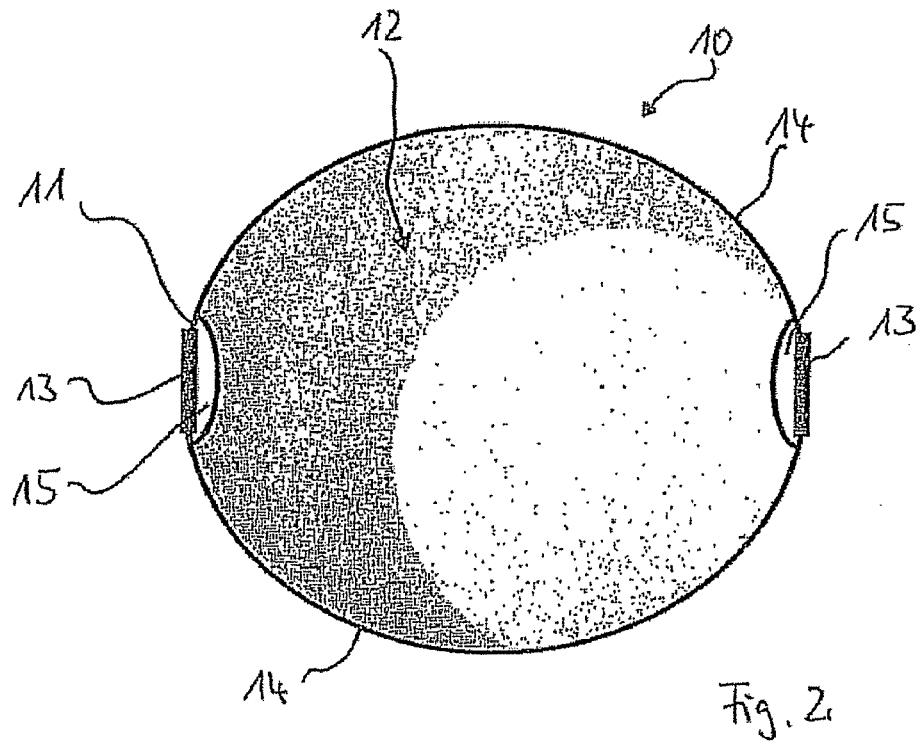
FIG. 2 a lighting designer according to the invention.

In FIG. 2, the lighting designer 10 is represented in its assembled and completely unfolded state. The frame 11 is inserted in such a way in the pockets formed along the margin 14 of the covering 12 that the handles 13 are located in the pocket-like recesses 15.

Figure 3:
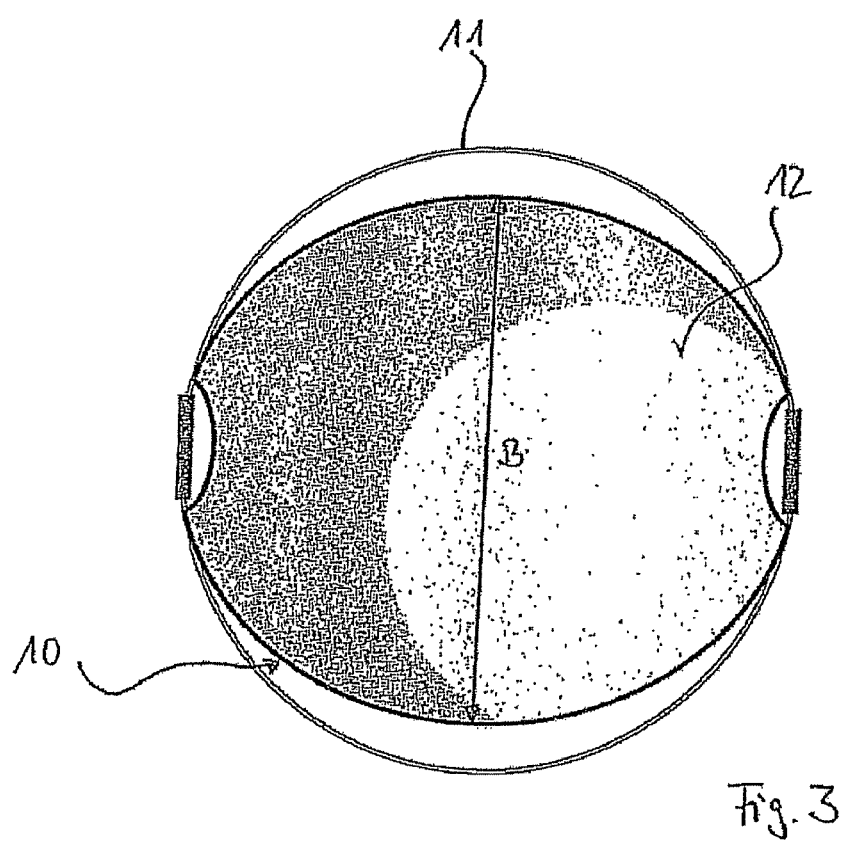
FIG. 3 a covered representation of a lighting designer according to the invention, and, for comparison, a completely unfolded frame in the resting position.

Compared particularly to the representation of FIG. 3, in which the following are represented one above the other, namely the lighting designer 10 which is forced into an oval due to the undersized design of the covering 12, and the completely slackened frame 11 without covering, it becomes clear that even if the lighting designer 10 is completely unfolded, the frame 11 continues to exert an outward force on the covering 12 in the direction of the width B, which force, as a result of the shape of the closed frame 11, and of the attachment of the covering 12 to the frame 11, which runs over the entire peripheral area, also acts on the other areas of the covering 12, tightening them reliably. The representations given here are purely schematic and not true to scale; in particular, they show an exaggerated representation of the undersize of the covering 12 compared to the diameter of the frame 11. In practice, the undersize is chosen in such a way that, although a reliable force that stretches the covering 12 is applied by the frame 11 to the covering 12, the force is not excessively large and does not risk damaging the covering 12, for example, nor does it cause a buckling of the lighting designer 10 out of its desired flat shape. To prevent such buckling, the width A of the covering 12 is oversize—which cannot be seen in schematic representation of the figure—in comparison to the diameter D of the slackened frame 11, as already mentioned above. However, in the area that presents this oversize, the frame 12, which continues to be deformed compared to its uncovered basic form, and under tension, even when the lighting designer 10 is completely unfolded, is yielding, so that it is also in a position that has a tightening effect in said area when the lighting designer 10 is completely unfolded. According to these requirements and basic conditions (to prevent buckling to the shape of a saddle surface, and nevertheless obtain sufficient stretching), the values for the undersize in the direction of the width B or the oversize in the direction of the width A of the covering 12, are chosen in relation to the diameter D of the frame 11. To prevent buckling, the frame 11 can also be formed from a spring steel or from another material with a rectangular cross section, with its larger extension transverse to the plane of the drawing.

As a result of the additional stiffening that the frame experiences in the area of the handles 13, the tightening effect of the frame 11 that still pushes outward is assisted even when the lighting designer 10 is completely unfolded.

Depending on the design of the covering 12, which can be a reflecting, light diffusing, or light reducing covering, the lighting designer 10 can be used as a reflector, a diffuser, or as a reducer.

As a result of the spring elasticity of the material of the frame 11 and its deformability, the frame 11 and thus the lighting designer 10 can be folded together as a whole, and thus reduced in size for transport or storage. This occurs entirely analogously to the description provided in GB 1562282 which was already mentioned in the introduction, so that, in this regard, reference can be made to this description. Thus, for example, by holding one of the handles 13 and rotating the other handle by 180°, a kind of double loop forming a "8" can be formed, which then in turn can be superposed by folding along the knot with two small loops, and thus it can be stowed away in reduced size.

In principle, the lighting designer according to the invention can be constructed using any dimensions; however, typical sizes for portable use are, for example, a width B in the range between 30 cm and 1.5 m.

The shapes that are shown, circular for the slackened frame and oval for the covering, do not represent the only possible shapes to implement the invention, although at this time those shapes are preferred as embodiment shape. In principle, the only important factor is that the covering, in comparison to the frame in its completely unfolded shape, presents a clear undersize in one direction, which, in the manner described above, leads to a permanent and defined force exertion by the frame which is till pushing outward in the unfolded state of the lighting designer, thus producing a tightening of the covering.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

List of Reference Numerals

10 Lighting designer
11 Frame
12 Covering
13 Handle
14 Margin
15 Recess
A Width
B Width
D Diameter

The invention claimed is:

1. A portable foldable lighting designer comprising:
a closed frame (11) made from an elastic, deformable material, where the frame is movable between a folded and an unfolded position; and
a covering (12), which is arranged in the frame (11) and held by the latter to manipulate the light, and which is kept tightened in the plane of the frame (11), when the lighting designer (10) is completely unfolded, by the material tension of the material of the frame (11), and wherein the covering (12) is dimensioned smaller in a direction (B) than a width (D) of the uncovered frame (11) in the completely unfolded position.

2. The lighting designer according to claim 1, wherein the uncovered frame (11) presents a circular shape in the completely unfolded position, while the covering (12) presents a shape that differs from a circular shape, with a width (B) in a shorter extension direction that is smaller than the width (D) of the circular shape of the completely unfolded, uncovered frame (11).

3. The lighting designer according to claim 1, wherein the covering is dimensioned greater in an extension direction (A), which is transverse to the direction (B), than the width (D), which lies in this extension direction (A), of the uncovered, completely unfolded frame (11) in the completely unfolded position.

4. The lighting designer according to claim 1, wherein the frame (11) is made of spring steel.

5. The lighting designer according to claim 1, wherein the covering (12) includes, along its peripheral margin (14), one of a plurality of loops and a tunnel through which the frame (11) is led for connection to the covering.

6. The lighting designer according to claim 1, further comprising at least one handle (13) arranged on the frame (11).

7. The lighting designer according to claim 6, wherein the at least one handle (13) is arranged in a section of the frame (11) at a distance from the direction (B), along which the covering (12) is dimensioned smaller than the width (D) of the uncovered frame (11) in the completely unfolded position.

8. The lighting designer according to claim 1, wherein the covering (12) is formed from a textile.

9. The lighting designer according to claim 1, wherein the covering (12) consists of an elastic material.

10. The lighting designer according to claim 1, wherein the covering (12) is prepared so it reflects light.

11. The lighting designer according to claim 1, wherein the covering (12) is prepared to reduce light.

12. The lighting designer according to claim 2, wherein the covering (12) is one of an oval and ellipsoid shape.

13. The lighting designer according to claim 6, wherein the designer includes a pair of handles (13) disposed diametrically on the frame (11).

14. The lighting designer according to claim 8, wherein the textile is one of a woven and a knitted textile.

15. The lighting designer according to claim 1, wherein the covering (12) is formed from an elastic film.

16. A portable foldable lighting designer comprising:
a frame (11) that is movable between a folded and an unfolded position, and
a covering (12) that is engaged in the frame (11) and kept taut in the plane of the frame (11) by the material tension of the frame (11) when in the unfolded position, and wherein the frame (11) has a width (D) when in the unfolded position and when not engaged with the covering (12), and the covering (12) has a width (B) in a first direction and a length in a second direction orthogonal to the first direction, and the width (B) of the covering (12) is smaller than the width (D) of the frame.

17. The lighting designer according to claim 16, wherein the frame (11) is substantially circular in shape and the width (D) thereof is the diameter of the circular shape; and wherein the covering (12) is one of oval and ellipsoid in shape and the width (B) of the covering (12) is smaller than the length of the covering (12), and the width (B) of the covering (12) is smaller than the diameter (D) of the frame (11).

18. The lighting designer according to claim 17, wherein the length of the covering (12) is substantially equal to the diameter (D) of the frame (11).

19. The lighting designer according to claim 17, wherein the length of the covering (12) is greater than the diameter (D) of the frame (11).

20. The lighting designer according to claim 16, wherein the covering (12) has an outer margin (14) and the margin (14) is provided with one of a plurality of loops and a tunnel, and the frame (11) is received through the one of the plurality of loops and the tunnel.

21. The lighting designer according to claim 1, wherein the covering (12) is prepared to diffuse light.

* * * * *